United States Patent
Cohen

(10) Patent No.: US 6,542,907 B1
(45) Date of Patent: Apr. 1, 2003

(54) METHOD AND APPARATUS FOR DECENTRALIZED, INVERTIBLE GENERATION OF BOUNDED-LENGTH GLOBALLY UNIQUE REPLICA IDENTIFIERS

(75) Inventor: Norman Howard Cohen, Spring Valley, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/542,111

(22) Filed: Mar. 31, 2000

(51) Int. Cl.[7] .................. G06F 12/00; G06F 17/30; G06F 7/00
(52) U.S. Cl. .................................. 707/203; 707/10
(58) Field of Search ................ 707/201, 202, 707/203, 204, 200, 10; 709/226, 201, 205

(56) References Cited

U.S. PATENT DOCUMENTS

| | | | |
|---|---|---|---|
| 4,558,413 A | | 12/1985 | Schmidt et al. |
| 4,714,996 A | * | 12/1987 | Gladney et al. ............ 707/203 |
| 4,792,921 A | | 12/1988 | Corwin |
| 5,117,351 A | | 5/1992 | Miller |
| 5,141,841 A | | 8/1992 | Wade |
| 5,304,992 A | | 4/1994 | Harashima |
| 5,522,077 A | | 5/1996 | Cuthbert et al. |
| 5,613,079 A | * | 3/1997 | Debique et al. ............ 711/141 |
| 5,640,608 A | | 6/1997 | Dockter et al. |
| 5,689,706 A | * | 11/1997 | Rao et al. .................... 707/201 |
| 5,732,282 A | | 3/1998 | Provino et al. |
| 5,787,247 A | * | 7/1998 | Norin et al. ................. 709/220 |
| 5,806,065 A | * | 9/1998 | Lomet ........................... 707/3 |
| 5,812,773 A | * | 9/1998 | Norin .......................... 709/201 |
| 5,812,793 A | * | 9/1998 | Shakib et al. ............... 709/201 |
| 5,815,710 A | | 9/1998 | Martin et al. |
| 5,832,487 A | * | 11/1998 | Olds et al. ..................... 707/10 |
| 5,884,322 A | | 3/1999 | Sidhu et al. |
| 5,946,689 A | * | 8/1999 | Yanaka et al. ................. 707/10 |
| 6,061,740 A | * | 5/2000 | Ferguson et al. ............ 709/201 |
| 6,256,740 B1 | * | 7/2001 | Muller et al. ................ 713/201 |
| 6,301,589 B1 | * | 10/2001 | Hirashima et al. ....... 707/104.1 |
| 6,338,092 B1 | * | 1/2002 | Chao et al. .................. 709/236 |
| 6,381,629 B1 | * | 4/2002 | Lee ............................. 709/201 |
| 6,421,686 B1 | * | 7/2002 | Martin, Jr. .................. 707/201 |
| 6,457,053 B1 | * | 9/2002 | Satagopan et al. .......... 709/226 |

OTHER PUBLICATIONS

H. M. Gladney (1989), Data Replicas in Distributed Information Services, pp. 75–97.*

P. Narasimhan, L. E. Moser, P. M. Melliar–Smith, Consistency of Partitionable Object Groups in a CORBA Framework, pp. 120–129.*

Parker et al., "Detection of Mutual Inconsistency in Distributed Systems", in IEEE Transactions on Software Engineering, vol. SE–9, No. 3, May 1985.

Pouzin et al., "A Tutorial on Protocols", in Proceedings of the IEEE, vol. 66, No. 11, Nov. 1978.

Markoff, J., "Growing Compatibility Issue: Computers and User Privacy", New York Times, Mar. 3, 1999.

Petersen et al., "Flexible Update Propagation for Weakly Consistent Replication", SIGOPS '97: Proceedings of the Sixteenth ACM Symposium on Operating Systems Principles, pp. 288–301, Oct. 1997.

\* cited by examiner

*Primary Examiner*—Safet Metjahic
*Assistant Examiner*—Merilyn Nguyen
(74) *Attorney, Agent, or Firm*—Gail H. Zarick, Esq.; McGinn & Gibb, PLLC

(57) ABSTRACT

A method (and system) for uniquely identifying one of a plurality of replicas of data, includes creating a second replica from a first replica, and computing a replica identifier of a bounded length for a second replica by applying a uniform transformation to a replica identifier of the first replica, without central coordination of identifier generation. In a preferred embodiment, the uniform transformation has an inverse, which can be applied to the identifier of the second replica to recover the identifier of the first replica. The second replica is created when its replica identifier is calculated to be an integer in a predetermined range.

27 Claims, 10 Drawing Sheets

| $f$ (number of generations) | number of chidren per generation |
|---|---|
| 1 | $2^{64}-1$ |
| 2 | $2^{32}-1$ |
| 4 | 65,535 |
| 8 | 255 |
| 16 | 15 |
| 32 | 3 |
| 64 | 1 |

METHOD AND APPARATUS FOR DECENTRALIZED, INVERTIBLE GENERATION OF BOUNDED-LENGTH GLOBALLY UNIQUE REPLICA IDENTIFIERS

BACKGROUND OF THE INVENTION

Field of the Invention

The present invention generally relates to a method and system for data replication and replica distribution, and more particularly to a method and system for generation of bounded-length globally unique replica identifiers.

Description of the Related Art

Conventional systems for replicating data on multiple computing devices and synchronizing the replicas require a way to identify each replica uniquely. For example, Parker et al., "Detection of Mutual Inconsistency in Distributed Systems", *IEEE Transactions on Software Engineering* SE-9, No. 3 (May 1983), pp. 240–247, describes the use of version vectors, which map replica identifiers to readings of logical clocks maintained at each replica, for tracking the relationships among different versions of data in a distributed system.

Petersen et al., "Flexible Update Propagation for Weakly Consistent Replication", SIGOPS '97: *Proceedings of the Sixteenth ACM Symposium on Operating Systems Principles*, Oct. 5–8, 1997, Saint-Malo, France, pp. 288–301, describes replica creation in the Bayou system. In this system, each replica of a database, other than the original one, is created as a copy of some existing replica. Thus, each replica, other than the original one, can be thought of as a child of a particular parent replica. (This approach precludes scenarios in which two independently created collections of data are merged by synchronizing them with each other, so that they become replicas of each other, each holding the union of their previous contents.) Since the device holding the child replica must contact the device holding the parent replica to obtain its initial contents, the child replica can also obtain its identifier from the device holding the parent replica. The identifier for the child replica, a two part identifier, includes the identifier of the parent replica and an integer uniquely distinguishing the new child replica from all other children of that parent.

U.S. Pat. No. 5,884,322 to Sidhu et al. describes a system in which a parent allocates a set of unique replica identifiers to a child. This set consists of the replica identifier for the child itself and the replica identifiers that can potentially be generated for the descendants of the child. The child, in turn allocates subsets of this set to its own children. However, Sidhu et al. does not stipulate the use of fixed-length identifiers, a specific mechanism for the distributed generation of unique identifiers, or a strategy for partitioning the available identifiers based on an entity's generation number. Similarly, U.S. Pat. No. 5,522,077 to Cuthbert et al. describes a system in which a client obtains a range of contiguous unique-identifier values from a central server, and may later return unused values to the server for reallocation.

U.S. Pat. No. 5,414,841 to Bingham et al. describes another centralized system in which unique identifiers can vary in length. Similarly, the replica identifiers described by Petersen et al. (supra) are not fixed length. Since each replica's identifier includes, as a component, the identifier of its parent replica, the length of a replica identifier grows with each generation of replicas. (If a tree is constructed to describe parent-child relationships, a generation corresponds to a level of the tree.) This is acceptable in an environment where a few replicas serve as parents of many children, so that there are few generations. However, in an environment in which many child replicas are themselves parents (so that a tree describing parent-child relationships has many levels), replica identifiers and the data structures that incorporate them, such as version vectors,.can quickly grow unacceptably large.

Bingham et al. (supra), Cuthbert et al. (supra), and the Cedar software version management system (U.S. Pat. No. 4,558,413 to Schmidt and Lampson) rely on central generation to ensure uniqueness of identifiers. Similarly, U.S. Pat. No. 5,640,608 to Dockter et al. describes the operation of a central tag server that generates tag values in ascending order, hands off blocks of unique tag values to clients in shared volatile storage, and keeps a nonvolatile record of the highest tag value generated so far, ensuring that duplicate tag values will not be generated upon recovery from a failure that destroys the contents of volatile storage. U.S. Pat. No. 5,304,992 to Harashima describes the distribution of centrally generated unique identifiers over a common communication line.

However, there are several advantages to assigning unique replica identifiers without coordinating through a central server:

The elements of the distributed system may have a peer relationship, in which no one device is designated as a server, and there may be no direct connection between an arbitrary pair of devices.

Reliance on coordination with a particular device (e.g., a central server or the like) means that a new replica cannot be created when that device is unavailable (e.g., because either the particular device or the network has failed).

Reliance on coordination through a central server precludes creating new replicas within mobile work groups (groups of colleagues traveling together whose devices are accessible to each other but not to a fixed network).

Channeling all requests for new replica identifiers through a central server can create a system bottleneck.

However, distributing (i.e., decentralizing) the assignment of replica identifiers to various devices raises the problem of ensuring that the generated identifiers are unique (i.e., that two devices unable to contact each other do not generate the sane identifier). Pouzin and Zimmerman, "A Tutorial on Protocols", *Proceedings of the IEEE* 66, No. 11 (November 1978), pp. 1346–1370, discusses the distributed generation of unique identifiers by hierarchical concatenation of a unique domain identifier (identifying, for example, a host computer) with an identifier that is unique within that domain. Richard W. Watson, "Identifiers (Naming) in Distributed Systems", in Lampson and Siegert, eds., *Distributed Systems—Architecture and Implementation, an Advanced Course*, Springer-Verlag, New York, 1981, classifies hierarchical concatenation as a special case of an identification scheme built around a sequence of contexts, in which an identifier for one context is mapped by that context into an identifier meaningful in the next context. Watson describes a distributed architecture in which globally unique identifiers consist of a server process address and a local name unique among the names generated by a server process. There may be many server processes generating unique identifiers, each having a unique server address assumed to be already known to the interprocess communication service that delivers a request for a new unique identifier to the server process.

Many inventions are concerned with the distributed generation of unique identifiers by hierarchical concatenation. U.S. Pat. No. 5,117,351 to Miller discloses a system for distributed generation of unique identifiers. Each unique identifier consists of a node identifier uniquely identifying a node of the distributed system, a monotonically increasing per-node time stamp (based on the node's system clock, but incremented when necessary to avoid duplicate use of the same time stamp), a random number used to reduce the probability of generating a duplicate identifier in case the system clock is reset, and a version number identifying the version of the system that generated the identifier, to prevent collisions with identifiers that may be generated by different mechanisms in the future. U.S. Pat. No. 4,792,921 to Corwin is similar, supporting distributed generation of identifiers containing a node identifier (in this case, a telephone number associated with the node) and a time stamp based on a real-time clock that is posited to tick at least once between the generation of any two identifiers. U.S. Pat. No. 5,815,710 to Martin et al. describes the generation of unique identifiers consisting of a network address such as an IP address, a process identifier, a time stamp, and a counter. U.S. Pat. No. 5,732,282 to Provino et al. describes the use of device-driver registries with globally unique identifiers to avoid the need to preassign globally unique identifiers for each registered device driver.

Each of these hierarchical approaches relies on preexisting unique identifiers (node identifiers or network addresses) that form part of the generated unique identifier. However, the generation of globally unique device identifiers is itself problematic. The use of Ethernet host identifiers for Ethernet hosts as the global device is applicable only to devices that contain Ethernet cards. Furthermore, because of privacy concerns (e.g., see Markoff, J., "Growing Compatibility Issue: Computers and User Privacy", *New York Times*, Mar. 3, 1999), there is a widespread public resistance to "burning" (permanently imprinting or associating) a unique identifier into each computing device as it is manufactured and transmitting that identifier in network interactions. IP addresses are inadequate as unique device identifiers because the same IP address may refer to any of several different devices, or to different devices at different times. Indeed, some devices are dynamically assigned new IP addresses each time they log on to the network, or at periodic intervals.

Another approach is to generate a relatively long random number (i.e., one consisting of many bits) for use as a replica identifier. If the random number is sufficiently long and truly random, the chance of the same identifier being generated twice will be minuscule. For example, the probability of two randomly generated 64-bit numbers being identical is less than one in 16 billion billion (arguably less than the probability of a distributed system failing because of a meteor colliding with the earth). However, this solution presumes that the random-number generator has an equal probability of producing each possible 64-bit number. It is difficult to guarantee that a random-number generator will have this property. Thus, the chance of generating duplicate identifiers may, in practice, be much larger. The probability of interest is not the probability that two randomly generated numbers are distinct, but that all members of a set of randomly generated numbers are distinct from each other. This probability increases rapidly as the size of the set grows (a phenomenon known as the "birthday paradox" because the probability of all people in a room having distinct birthdays decreases rapidly as the number of people in the room increases, falling below 50% as soon as only 24 people are in the room). The distributed generation of duplicate random numbers is not easily detected. Indeed, it is likely to "break" the distributed system in a way that may be difficult to repair. However small the probability of generating duplicate replica identifiers, a disconcerting solution is provided by a system whose proper function relies on luck rather than mathematically provable guarantees.

SUMMARY OF THE INVENTION

In view of the foregoing and other problems, disadvantages, and drawbacks of the conventional methods, it is an object of the present invention to generate replica identifiers whose lengths are bounded by a fixed, predetermined number of bits, and to ensure the uniqueness of these identifiers without coordinating with a central entity.

In a first aspect, a method for uniquely identifying one of a plurality of replicas of data includes creating a second replica from a first replica, computing a replica identifier of a fixed length for the second replica by applying a uniform transformation to a replica identifier of a fixed length for the parent. The first replica is a parent replica of the second replica, and the uniform transformation is dependent upon a record of the parent replica describing a set of replica identifiers previously assigned to replicas of the parent.

In a first exemplary method, the present invention generates b-bit replica identifiers in a compact manner, in the sense that each of the $2^b$ possible bit combinations is a well-formed replica identifier.

First, the initial replica is identified by the integer 0, and its first child is identified by the integer 1. If a replica is identified by some integer m>0, its first child is identified by the integer 2m. If, on the other hand, a replica already has one or more children, the last of which is identified by the integer n, the next child of that replica is identified by the integer 2n+1. Replica creation will fail if the new replica's identifier exceeds $2^b-1$.

This exemplary method of the present invention combines several conventional approaches in a unique and unobvious way. Specifically, in describing the Heapsort algorithm and its relationship to the tree-based Tournament Sort algorithm of Iverson et al., A Programming Language, John Wiley & Sons, New York, 1962), Williams, "Algorithm 232: Heapsort", *Communications of the ACM* 7, No. 6 (June 1964), pp. 347–348, implicitly exploits a compact numbering scheme for nodes of a binary tree, in which the root is numbered 1 and a node numbered n has a left child numbered 2n and a right child numbered 2n+1.

Section 2.3.2 of Knuth, *The Art of Computer Programming, Volume 1: Fundamental Algorithms*, 2nd ed., Addison-Wesley, Reading, Mass., 1973, describes a natural correspondence between binary trees and forests of arbitrary trees. This correspondence, in effect, equates the left-child link of a binary-tree node with a link to the first child of a node in the arbitrary tree, and the right-child link of a binary-tree node with a link from a node in the arbitrary tree to its next sibling.

The exemplary method of the invention combines conventional approaches in a novel way because the replica identifier associated with a node in the replica tree is the Williams (supra) numbering of the corresponding node in the naturally corresponding binary tree of Knuth (supra).

In a second exemplary method, the invention imposes a bound on the number of generations, and generation-specific bounds on the number of children for a replica in a given generation. A replica identifier is divided into a plurality of fields, each corresponding to one generation number. The number of fields is fixed, as is the number of bits in the field corresponding to a given generation number. For a replica with a given generation number, each field of its identifier corresponding to a higher generation number contains a special reserved value, such as zero. The identifier for a child replica is derived from the identifier of its parent replica by replacing the reserved value in the field corresponding to the child's generation number with some other value, distinct from the values used in this field for other children of the same parent. Replica creation fails if the generation number for the new replica would exceed the predetermined maximum generation number, or if all unreserved values for the field corresponding to the new replica's generation number have already been assigned to other children of the new replica's parent.

This encoding leaves some of the possible bit combinations unused. Any bit pattern in which one field contains the reserved value, but another field, corresponding to a higher generation number, does not, cannot be a replica identifier.

Typically, an early-generation replica will reside on a server and have many copies made of it, but a late-generation replica will reside on a personal device and have few copies made of it. The invention can take advantage of this pattern by using wider fields for earlier generations and narrow fields for later generations. Many combinations of field widths are possible. For example, a 64-bit replica identifier might have five fields of (in increasing generation order), 30; 16, 10, 5, and 3 bits. Then, the original replica could have up to 268,435,455 first-generation children, each first-generation replica could have up to 65,535 second-generation children, each second-generation replica could have up to 1,023 third-generation children, each third-generation replica could have up to 127 fourth-generation children, and each fourth-generation replica could have up to 7 fifth-generation children.

The present invention is applicable not only to replicated databases, but to any system in which it is necessary to identify replicas. Such systems include, for example, the distribution of intellectual property such as music or statistical reports over the Internet. In such contexts, a bound on the number of generations of replicas, and the number of replicas created at each generation, can be considered an important feature rather than a limitation.

The above-discussed transformations from parent replica identifiers to child replica identifiers are invertible. That is, it is possible to determine the replica identifier of a parent from the replica identifier of a child. Thus, a given replica's "pedigree" (i.e., the sequence of copies made, starting from the original replica, culminating in the creation of the given replica) can be determined from the given replica's replica identifier. Knowledge of a replica's pedigree can be helpful in determining the origin of unauthorized copies. Thus, a replica identifier makes an ideal "watermark".

Thus, with the unique and unobvious features of the invention, the above-mentioned Petersen et al. approach of presuming that replicas are created as children of parent replicas, and deriving a child replica's identifier from the identifier of its parent replica, is performed while restricting replica identifiers to a fixed length and while providing a unique identifier for each replica made without central coordination.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
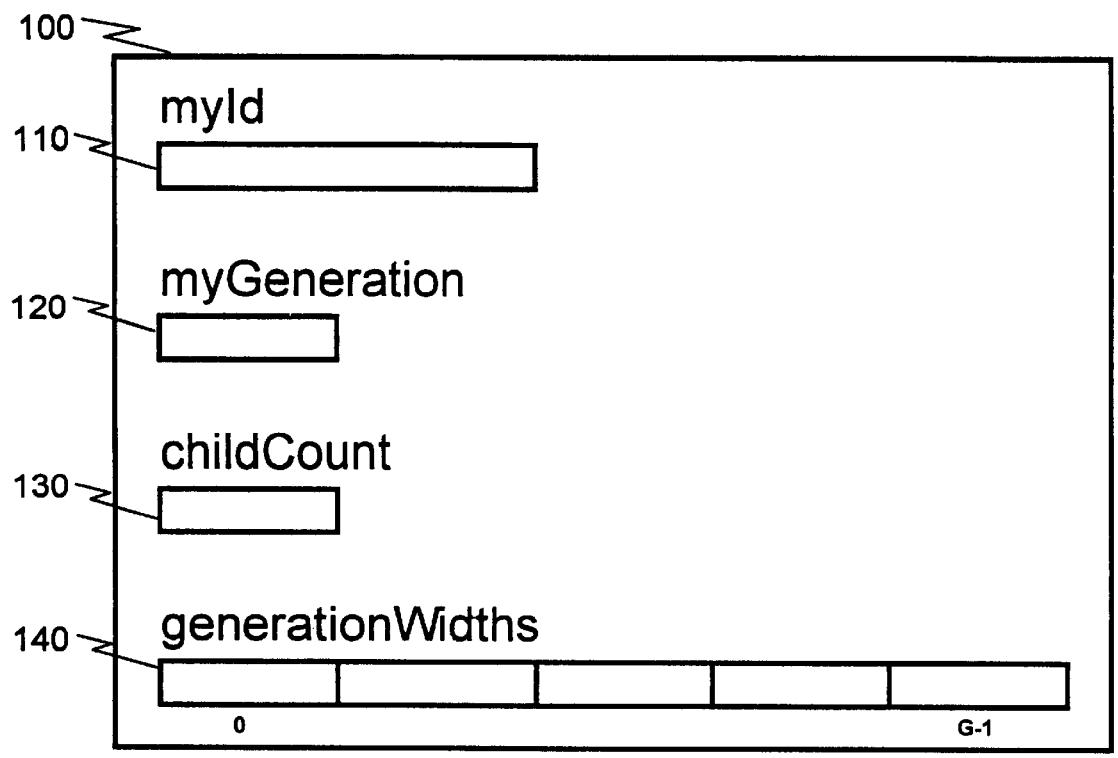
FIG. 1 is a block diagram illustrating the replica-ID creation mechanism of a replica.

Referring now to the drawings, and more particularly to FIGS. 1–11, there are shown preferred embodiments of the method and structures according to the present invention.

Preferred Embodiment

In some environments (so-called "first environments"), the pattern of replica creation is such that there is a strong, predictable relationship between the number of children a replica is expected to have and the depth of the replica in the creation hierarchy. In other environments (so-called "second environments"), there may be a general tendency for replicas at a higher level in the hierarchy to have more children, but no way to predict the number of children a particular replica will have.

Generally, the preferred embodiment includes dividing a replica ID into multiple fields, each corresponding to a particular generation and having a particular width, in environments of the first kind, and treating a replica ID as a unitary nonnegative integer x, assigning the replica ID 2x to its first child and 2x+1 to its next sibling, in environments of the second kind.

Generating Multiple-Field Replica IDs From Parent IDs

For the multiple-field approach, FIG. 1 illustrates a replica-ID creation mechanism 100 of a replica. This mechanism includes a memory cell myId 110 containing the replica's own replica ID, a memory cell myGeneration 120 containing the replica's generation number (i.e., its depth in the replica-creation hierarchy, a memory cell childCount 130 containing the number of children created so far from the replica, and an array generationWidths 140 containing the number of bits assigned to each.generation.

The generationWidths array 140 has G components, with indices ranging from 0to G−1, where G is the maximum number of child generations allowed (excluding the generation of the initial replica). The generationWidths array 140 has the same length and contents for the root replica and all replicas directly or indirectly descended from it. The component generationWidths[i], $0 \leq i < G$, gives the width in bits of the field used to distinguish among children in generation i+1. A field of this width allows a replica in a generation i to have $$2^{generationWidths[i]} - 1$$

children, where $0 \leq i < G$.

In the preferred embodiment, fields are arranged consecutively from the high-order end of the replica ID (viewed as an s-bit unsigned integer, where s is the sum of the components of generationWidths) to the low-order end, in order of increasing, generation numbers. As would be known bygone of ordinary skill in the art taking the present application as a whole, the present invention is not limited to the embodiments described above, but also covers any arrangement of the fields within the replica ID, including splitting fields into groups of noncontiguous bits.

Figure 2:
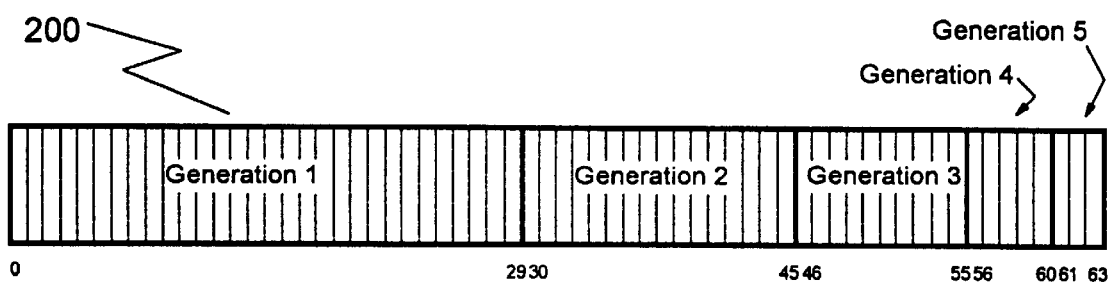
FIG. 2 is a diagram illustrating the layout of a 64-bit replica ID corresponding to a generationWidths array.

FIG. 2 illustrates a layout 200 of a 64-bit replica ID corresponding to a generationWidths array with the components 30, 16, 10, 5, and 3, in that order. Hence, in FIG. 2, the first 30 bits (e.g., 0–29) are allocated to the field distinguishing among children of the replica with generation number zero (i.e., the root replica), so the root replica may have $2^{30}$ children, 16 bits are allocated to the field distinguishing among children of replicas with generation number 1, so that each replica of the first generation will have $2^{16}$ children, and so forth. In the replica identifier for the root replica, all these fields would contain the value zero. In the replica identifier for a third child of a second child of the root replica, these fields would contain the values 2, 3, 0, and 0, respectively. In the replica identifier for a fourth child of a fifth child of a third child of a second child of the root replica, these fields would contain the values 2, 3, 5, and 4, respectively.

Figure 3:
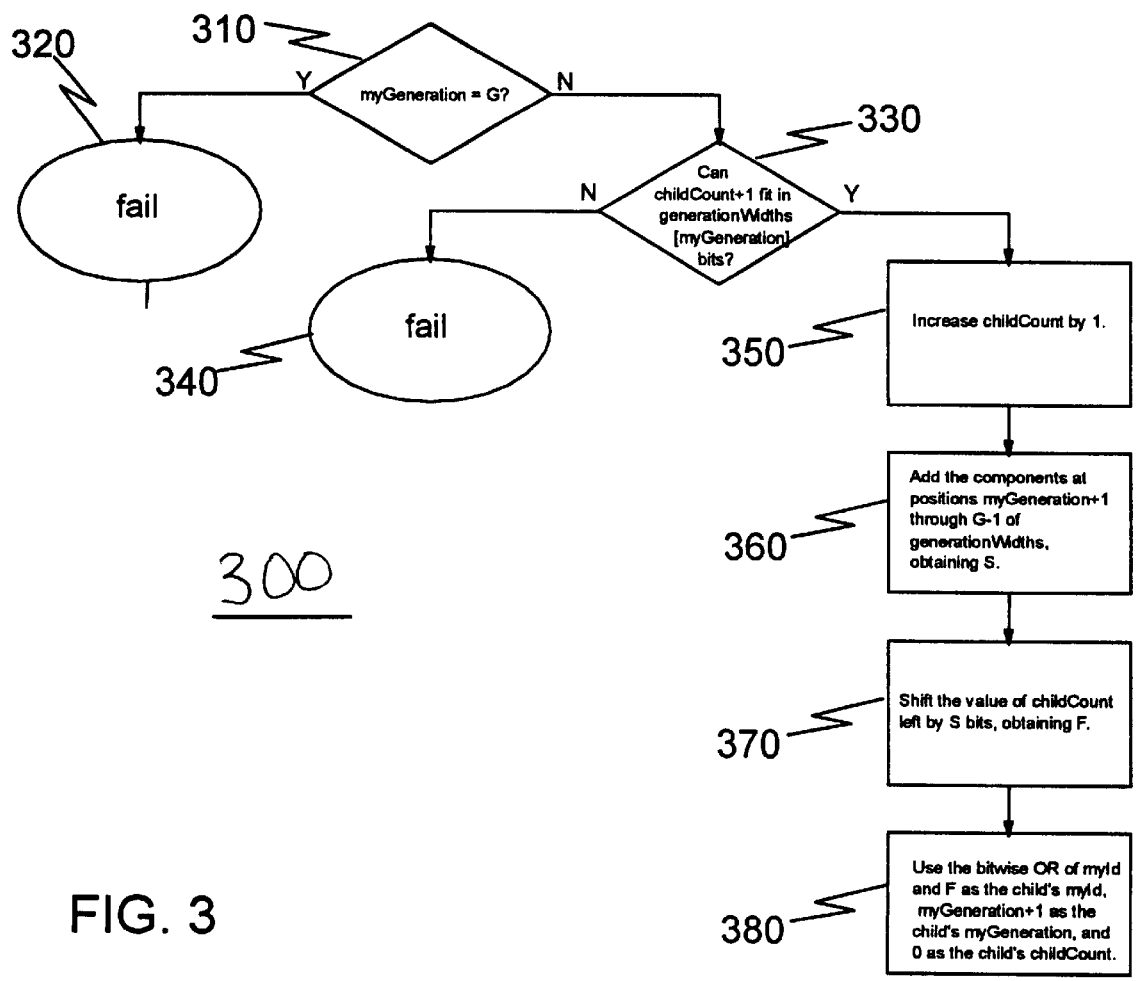
FIG. 3 is a block diagram illustrating a method of creating a multiple-field child replica ID from the replica ID of the parent.

FIG. 3 illustrates a process 300 of creating a multiple-field child replica ID by a given parent replica.

First, in step 310, a comparison is made of the memory cell myGeneration with G (the length of the generationWidths array). If these two values are equal, then the would-be parent replica already belongs to the deepest allowed generation, so the attempt to create a child replica ID fails in step 320.

Conversely, in step 310, if these two values are not equal (i.e., myGeneration is less than G), then the process proceeds to step 330.

In step 330, a check is performed to ascertain whether childCount+1 is small enough to fit in the field allocated to the child's generation (i.e., whether childCount+1 $\leq 2^{generationWidths[myGeneration]} - 1$.

If not, the would-be parent replica already has the maximum number of children allowed for a replica in its generation, and the attempt to create a child replica ID fails in step 340.

If it does not fail (a "YES" in step 330), then the creation of the child replica ID will succeed and the process continues to step 350. In step 350, the contents of the memory cell childCount is incremented by one.

In steps 360 through 380, a new replica ID is created by making a copy of the parent replica ID and inserting the new value of childCount in the field of that copy corresponding to the child's generation. In step 360, the number of bits to the right of that field is computed. That is, the components at positions myGeneration+1 through G-1 of the generationWidths are added, obtaining a sum S. In step 370 the new value of childCount is shifted left by S bits to obtain F, which contains the field value to be inserted, shifted into the bit positions corresponding to the field. In step 380, the logical OR of F and the parent replica ID is computed, and the result is used as the child replica ID. The ID-creation mechanism of the child replica is initialized with the result of the logical OR in the child's myId cell, one more than the contents of the parent's myGeneration cell in the child's myGeneration cell, zero in the child's childCount cell, and the contents of the parent's generationWidths array in the child's generationWidths array.

One way to use this mechanism is by allowing all parent replicas the same number of children, regardless of generation number. Specifically, a fixed-length sequence of b bits is divided into G fields of b/G-bits each. A replica in generation n includes n nonzero fields followed by G-n fields equal to zero. The first n-1 of these fields are the nonzero fields of the parent's replica identifier, and the $n^{th}$ nonzero field is a unique integer in the range 1 to $2^{b/G}-1$, assigned by the parent to distinguish this replica from its other children. Replica identifiers can be generated for up to $2^{b/G}-1$ children per parent and up to G generations (excluding generation zero).

Figures 8, 9:
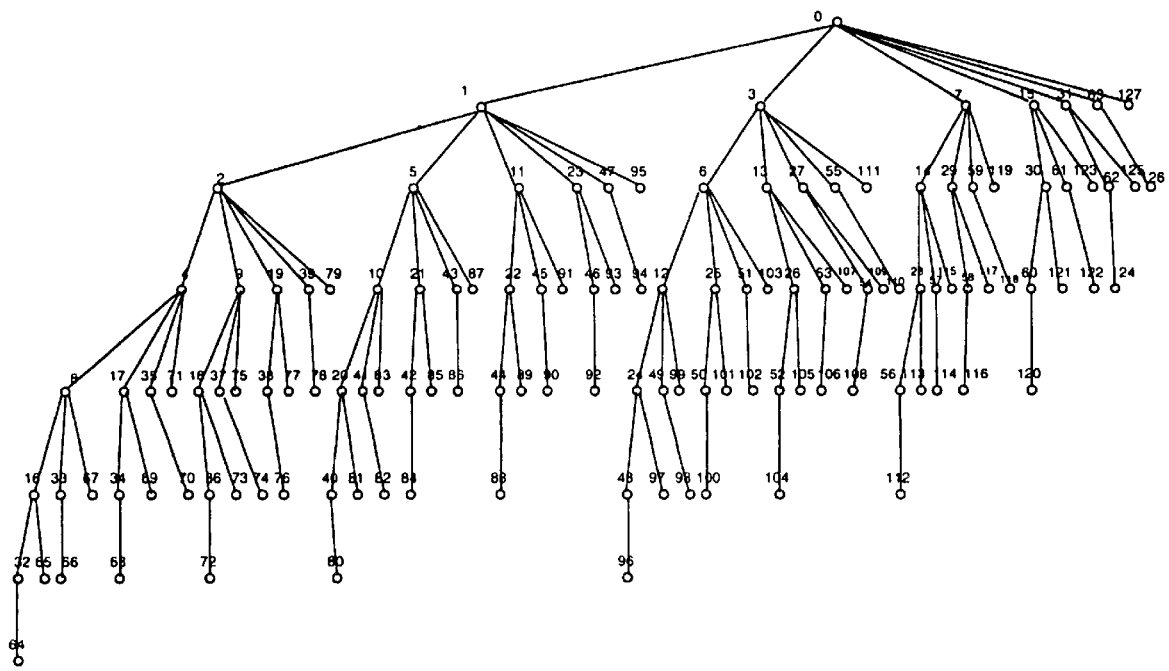
FIG. 8 is a table illustrating the possible choices of f when b=64.
FIG. 9 is an example of a variable-width, variable-depth tree of parent and child replicas.

The value chosen for G is a factor of b chosen based on the expected number of generations (the expected depth of replica generation) and the expected number of children per generation (the expected breadth of replica generation). The table in FIG. 8 illustrates the consequences for the possible choices of G when b=64. In the first several rows of the table, the number of generations is highly constrained, with G=1 corresponding to completely centralized creation of replicas. In the last few rows of the table, the number of children is highly constrained. The third row of the table, with up to four generations and up to 65,535 children per generation, represents a reasonable compromise for many applications.

As would be known by one of ordinary skill in the art taking the present application as a whole, the generationWidths array can be dispensed with if all parent replicas are to be allowed the same number of children, since all references to components of the array could be replaced by references to the predetermined value b/G.

Recovering Multiple-Field Parent Replica IDs From Child IDs

Figure 4:
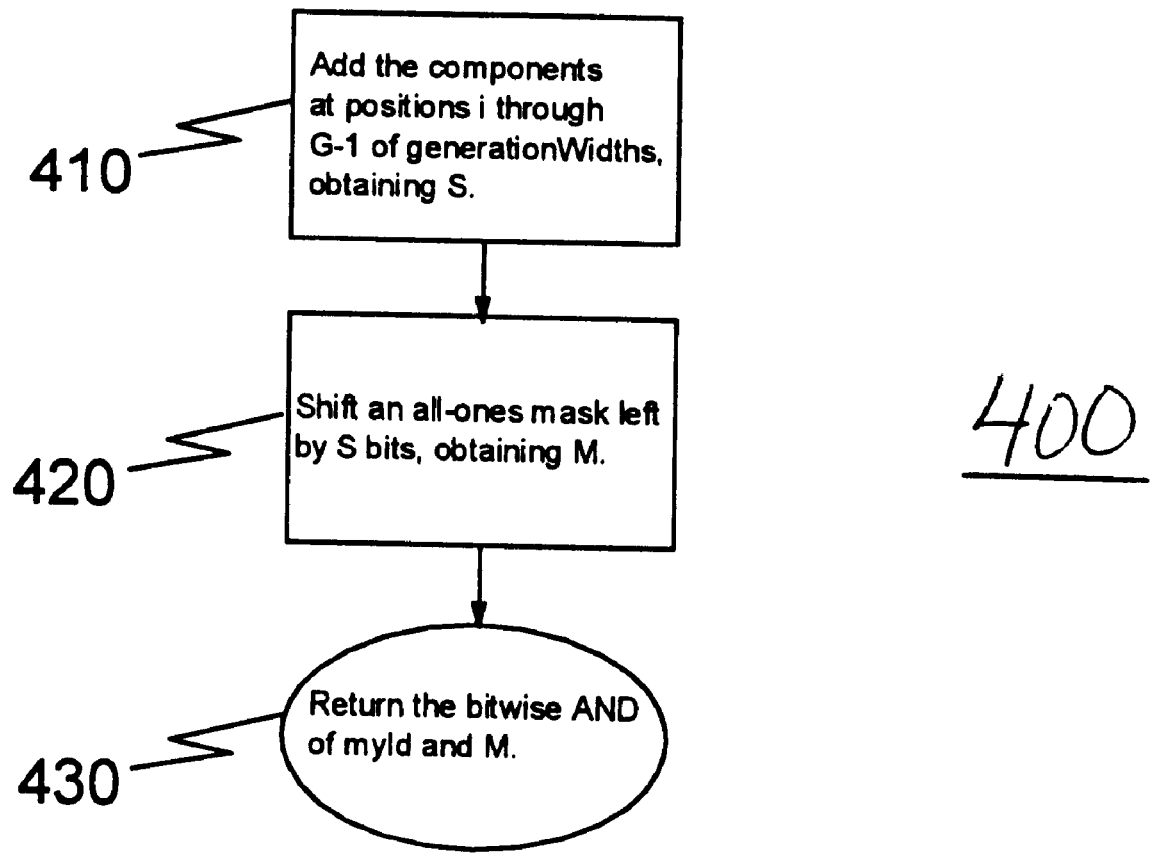
FIG. 4 is a block diagram illustrating the addition of field widths to determine the number of bits to be set to zero when computing a parent replica ID from a child replica ID.

Given a multiple-field replica ID, the replica ID of the ancestor in generation i is computed simply by setting the fields corresponding to higher-numbered generations to zero. As illustrated in FIG. 4, this computation method 400 includes a step 410 for adding the contents of components i through G-1 of generationWidths to determine the number of bits S to be set to zero. In step 420, a mask consisting entirely of one bits is shifted left by S bits, to obtain M, a mask with one bits at the positions in the replica ID myID that are not to be set to zero. In step 430, the logical AND of the shift result M and the replica ID myId is computed, to obtain the ancestor replica ID.

Generating Unitary-Nonnegative-Integer Replica IDs From Parent IDs

Turning now to FIG. 9, a variable-depth, variable breadth encoding will be described. In this encoding, the present invention generates b-bit replica identifiers in a compact manner, in the sense that each of the $2^b$ possible bit combinations is a well-formed replica identifier.

The initial replica is identified by the integer 0, and its first child is identified by the integer 1. If a replica is identified by some integer m>0, its first child is identified by the integer 2m. If a replica already has one or more children, the last of which is identified by the integer n, the next child of that replica is identified by the integer 2n+1. Replica creation will fail if the new replica's identifier exceeds $2^b-1$. The replica identifiers created by this method are guaranteed to be unique.

The parent-child relationship among replicas can be depicted by a tree 900 in which replicas are represented by tree nodes having a corresponding parent-child relationship. In practice, the number of bits in a replica identifier would be much greater than 7, but it is not practical herein to illustrate the trees corresponding to realistic values of b.

The number of children that a replica may have is constrained by the number of times that replica IDs for additional children can be computed before obtaining a result that exceeds $2^b-1$. The set of replicas with replica identifiers that fit in b bits spans a wide range of depth-breadth tradeoffs. There are replica identifiers for up to b direct children and up to b generations of descendants of the original replica. However, not all replicas are allowed the same number of children, and different children of a given replica are allowed different numbers of descendent generations.

Thus, the set of possible bit patterns accommodates replicas with many generations of descendants but few children per generation (because the later siblings, which are capable of spawning fewer generations, will not be created), replicas with few generations of descendants but many children per generation (because the later siblings, which are capable of spawning fewer generations, will not be required to spawn many generations), and replicas lying somewhere in between. As shown in the tree of FIG. 9, replicas with few ancestors and few earlier siblings will have relatively many descendants, whereas replicas with many ancestors or many earlier siblings will have relatively few descendants. This property provides flexibility by obviating the need to predict beforehand whether the tree is going to be wide or deep.

Figure 5:
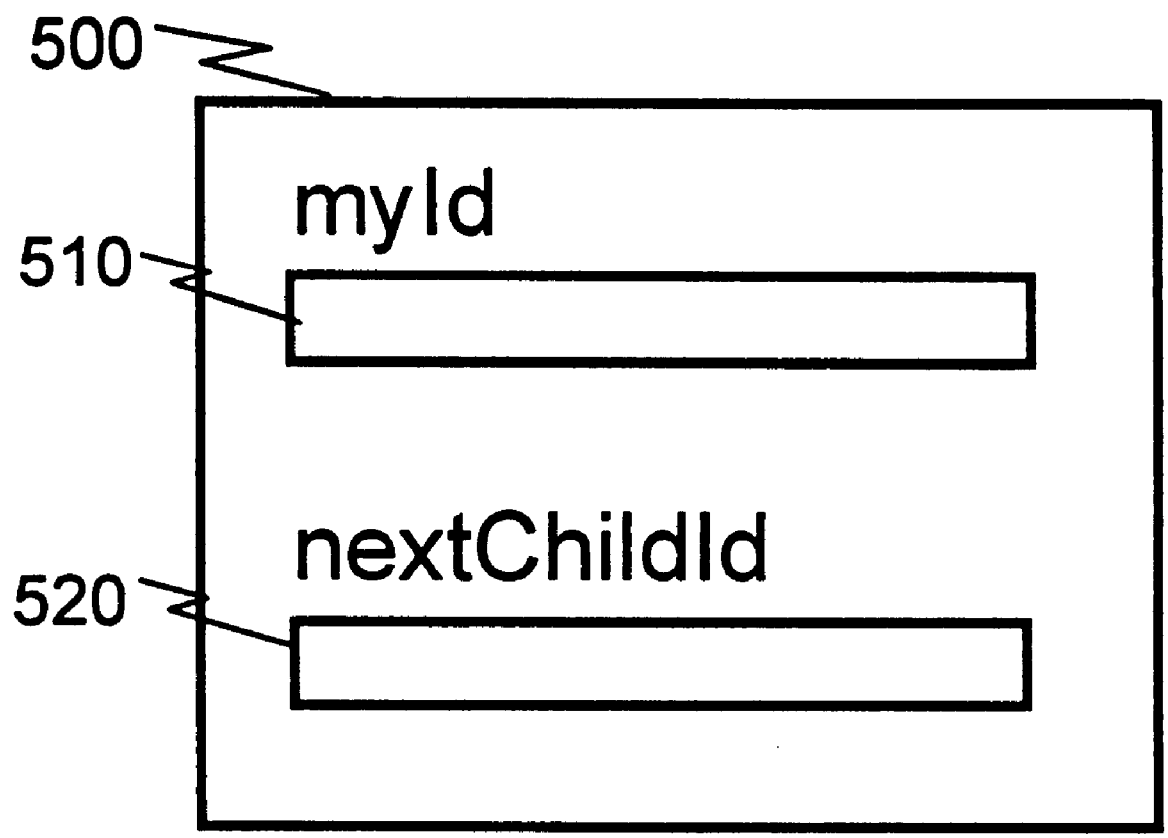
FIG. 5 is a block diagram illustrating the state of the replica-ID creation mechanism of a replica.

FIG. 5 illustrates the state 500 of the replica-ID creation mechanism of a unitary-nonnegative-integer replica.

This state includes a memory cell myId 510 containing the replica's own replica ID and a memory cell nextChildId 520 containing the replica ID to be assigned to the replica's next child, or zero if the replica cannot have any further children.

In the root replica, myId 510 contains the value 0 and nextChildId 520 contains the value 1. It is assumed that there is a constant b giving the number of bits in a replica ID, and MAX=$2^b-1$ denotes the largest unsigned integer that can fit in a replica ID.

Figure 6:
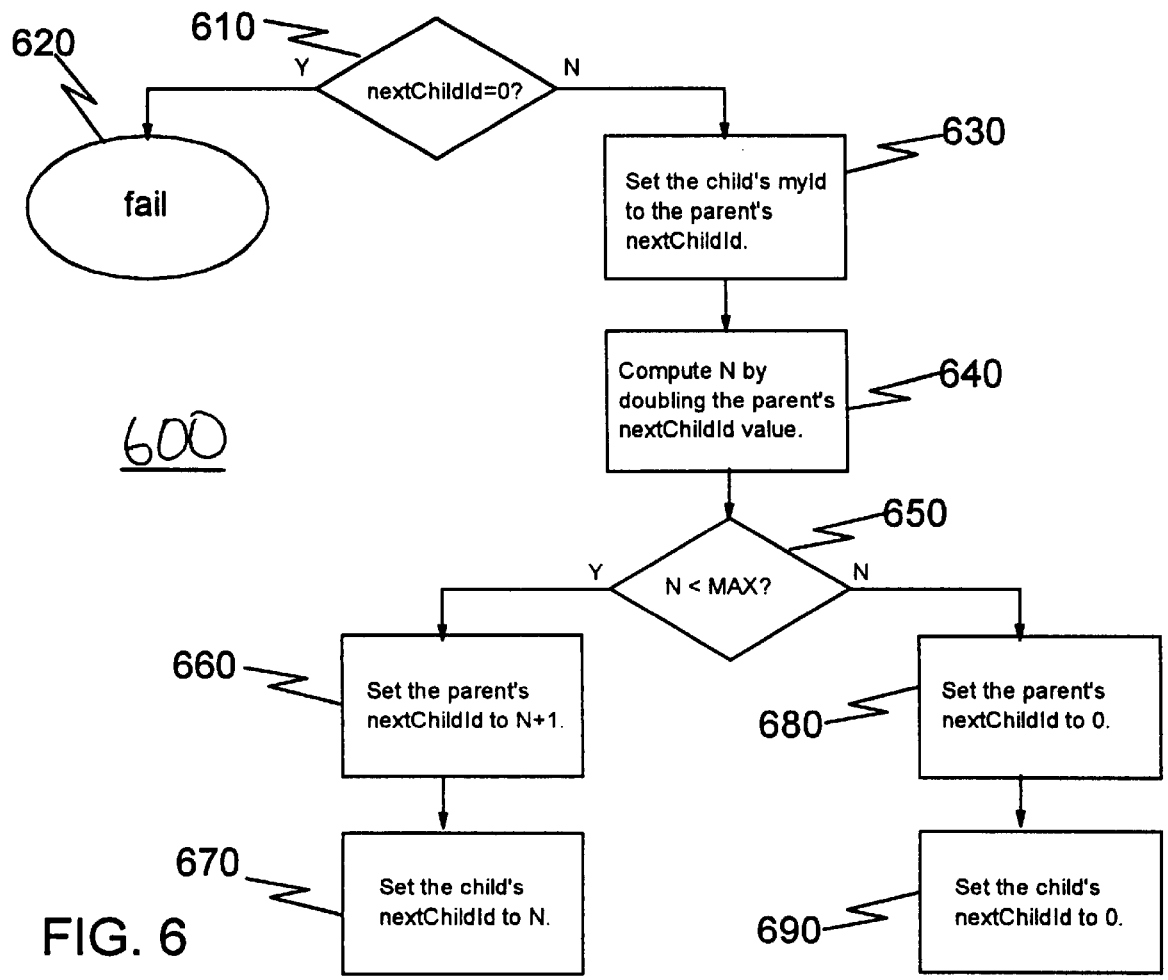
FIG. 6 is a block diagram illustrating the creation of a unitary-nonnegative-integer replica ID.

FIG. 6 illustrates a method 600 for creating a unitary-nonnegative-integer child replica ID by a given parent replica.

First, in step 610 of the method 600, it is determined whether the nextChildId cell of the parent replica contains the value 0. If the nextChildId cell of the parent replica contains 0, then the replica creation fails, as shown in step 620. If the determination in step 610 is "NO", then the process proceeds to step 630, in which the value contained in the parent's nextChildId cell is used as the child's replica ID, and placed in the child's myId cell.

In step 640 N is computed by doubling the parent's nextChildId value.

In step 650, it is determined whether N is less than MAX. If N is less than MAX (i.e., a "YES" in step 650), then both the parent replica and the child replica are capable of generating further children. In this case, in steps 660 and 670 respectively, the parent's nextChildId is set to N+1 and the child's nextChildId is set to N.

Conversely, if the determination in step 650 is "NO", then neither the parent replica nor the child replica is capable of generating further children, because the values that would be used for their replica IDs would not fit in b bits. In this case, in steps 680 and 690, both the parent's nextChildId and the child's nextChildId are set to zero.

Recovering Unitary-Nonnegative-Integer Parent Replica IDs From Child IDs

Figure 7:
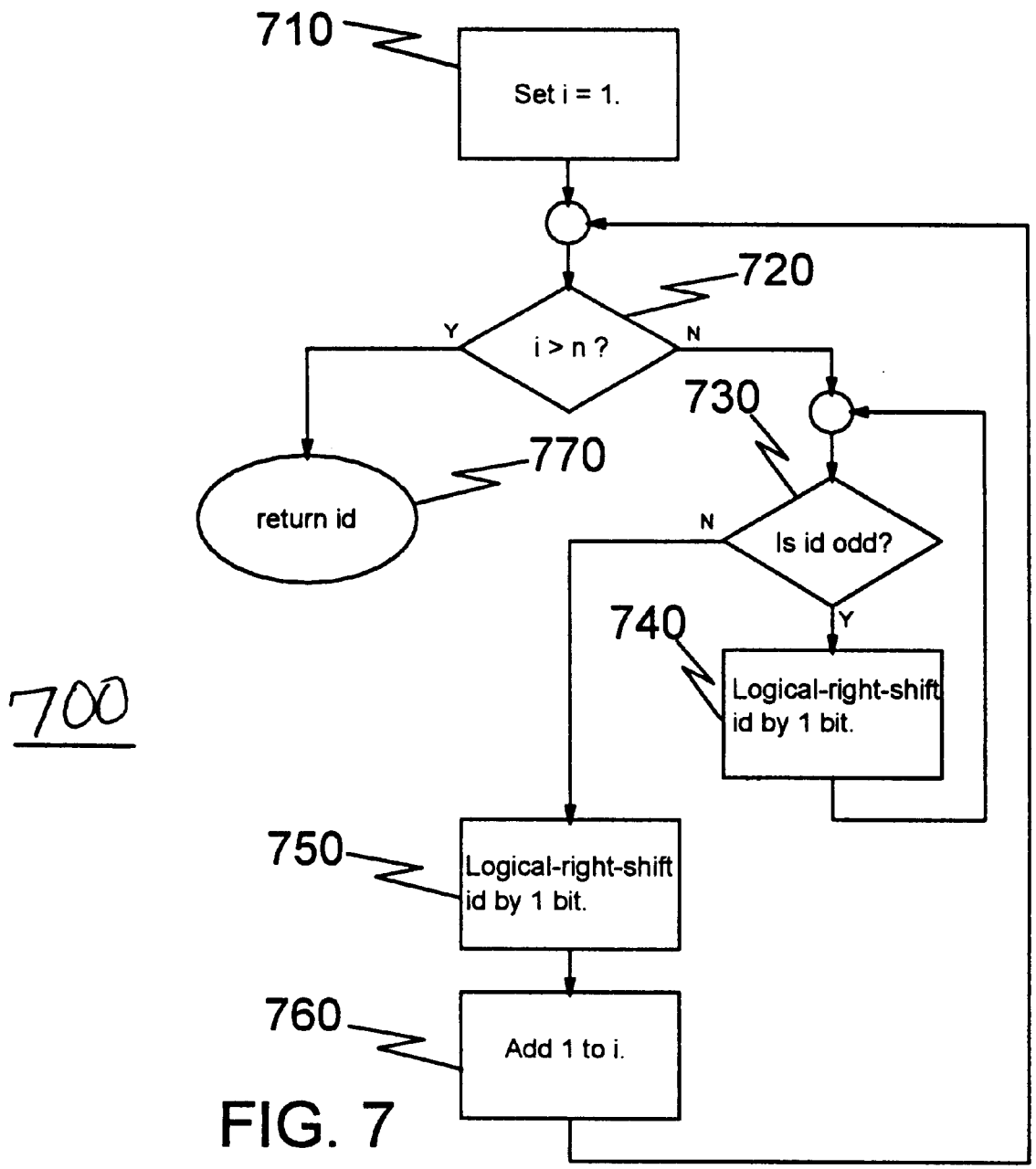
FIG. 7 is a block diagram illustrating how to compute the replica ID for the ancestor n levels above it in the replica-creation hierarchy.

FIG. 7 illustrates a method 700, given a unitary-nonnegative-integer replica ID such as those created by method 600, of computing the replica ID for the ancestor n levels above it in the replica-creation hierarchy. The memory cell id is set to the value of the replica ID and a calculation that replaces id with the replica ID for the parent of the replica identified by id is repeated n times (steps 710 through 760). Then in step 770, the resulting value of id is returned.

The repetition is accomplished by setting a counter i to one in step 710 and entering an outer loop that repeatedly compares i to n in step 720 and exits when i is greater than n, replaces id with the replica ID for the parent of the replica identified by id in steps 730 through 750, and increments i in step 760.

A unitary-nonnegative-integer replica ID for a first child is always generated by doubling the replica ID of its parent, so the replica ID for a first child is always even. The replica ID for a child other than the first is obtained by doubling the replica ID for the previous child and adding one, so the replica ID for a subsequent child is always odd.

Thus, the process of replacing id with the replica ID for the parent of the replica identified by id includes repeatedly replacing id with (id−1)/2 as long as id is odd, thus obtaining the replica ID of the first sibling, then replacing id with id/2, thus obtaining the replica ID of the parent.

Repeatedly replacing id with (id−1)/2 consists of executing an inner loop that repeatedly tests in step 730 whether id is odd, exiting the loop if id is even (the path labeled "N" in step 730), but shifts id right by one bit in step 740 if id is odd (the path labeled "Y" in step 730). Replacing id with id/2 consists of shifting id right by one bit in step 750. (The test of whether id is odd, in step 730, consists of examining the low-order bit of id; id is even if its low-order bit is 0 and odd if its low-order bit is 1.)

Apparatus

Figure 10:
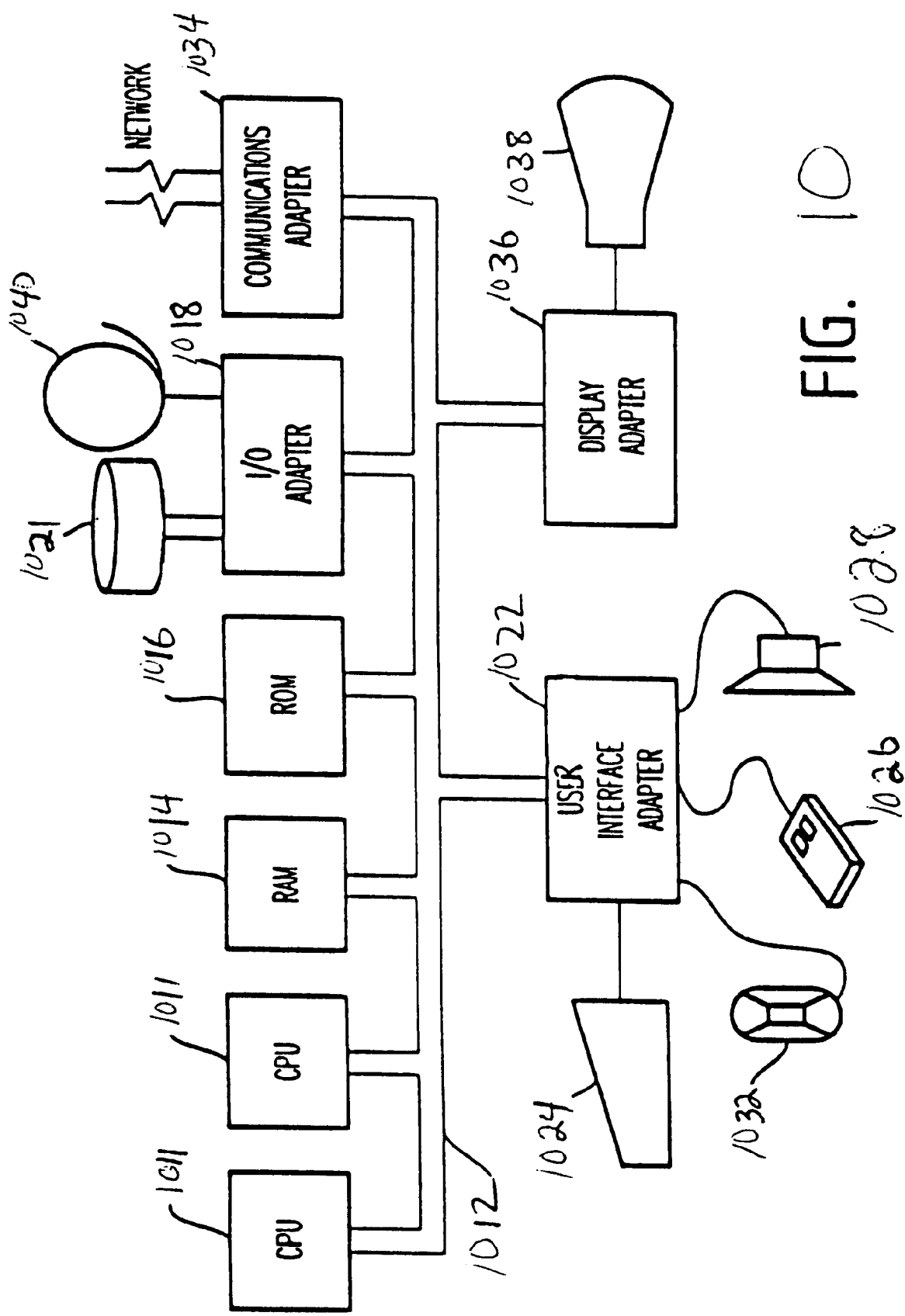
FIG. 10 illustrates an exemplary information handling/computer system 1000 for use with the invention.

FIG. 10 illustrates a typical hardware configuration of an information handling/computer system 1000 in accordance with the invention. The computer system 1000 preferably has at least one processor or central processing unit (CPU) 1011.

The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface devices to the bus 1012), a communication adapter 1034 for connecting an information handling system to a data processing network, the Internet, an intranet, etc., and a display adapter 1036 for connecting the bus 1012 to a display device 1038 and/or printer 1039.

In addition to the hardware/software environment described above, a different aspect of the invention includes a computer-implemented method for performing the above steps. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Figure 11:
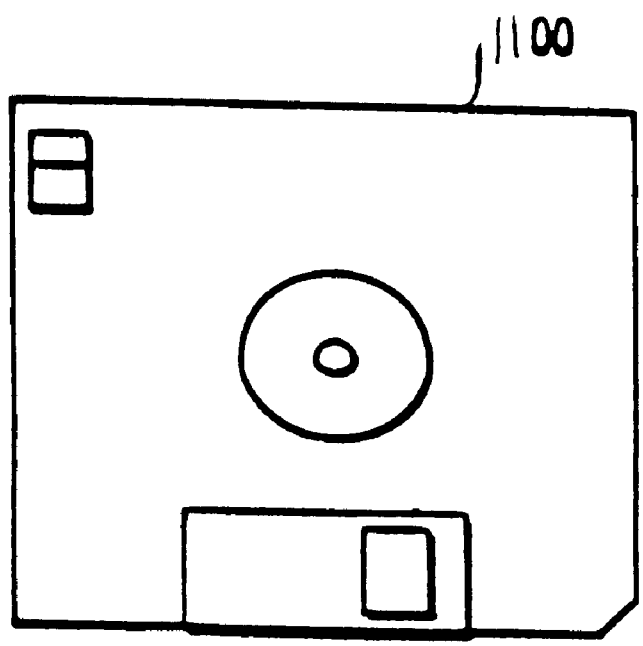
FIG. 11 illustrates a medium 1100 for storing a program for implementing the method according to the present invention.

As shown in FIG. 11, in addition to the hardware and process environment described above, a different aspect of the invention includes a computer-implemented method of uniquely identifying replicas of data. As an example, this method may be implemented in the particular hardware environment discussed above.

Such a method may be implemented, for example, by operating the CPU 1011 (FIG. 10), to execute a sequence of machine-readable instructions. These instructions may reside in various types of signal-bearing media.

The signal-bearing media may include, for example, a RAM contained within the CPU 1011, as represented by the fast-access storage. Alternatively, the instructions may be contained in another signal-bearing media, such as a magnetic data storage diskette 1100 (FIG. 11), directly or indirectly accessible by the CPU 1011.

Whether contained in the diskette 11100, the computer/CPU 1011, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, or digital optical tape), paper, "punch" cards, or other suitable signal-bearing media including transmission media such as digital and analog and communication links and wireless. In an illustrative embodiment of the invention, the machine-readable instructions may comprise software object code, compiled from a language such as Ada.

Conclusion

With the unique and unobvious features of the present invention, globally unique replica identifiers of bounded length can be generated from parent replica identifiers, without central coordination. Bounded-length replica identifiers can be generated, for example, by fixing the number of replica generations and the number of children allowed for a parent replica in a given generation, or by using a compact variable-depth and variable-breadth encoding With either of these approaches, replica IDs can be encoded in a manner that allows the replica: ID of a replica's parent to be deduced from the replica ID of the replica, thus allowing a replica's ancestry to be determined from its ID. Thus, the invention is unique in generating fixed length, unique replica identifiers, without central coordination, in an invertible manner.

While the invention has been described in terms of preferred embodiments, those skilled in the art will recognize that the invention can be practiced with modification within the spirit and scope of the appended claims.

What is claimed is:

1. A method for uniquely identifying, with replica identifiers of bounded length, each replica in a plurality of replicas of data, each replica having an associated child-replica-ID creation mechanism, said method comprising:
   creating a child replica from a parent replica;
   computing a replica identifier for said child replica by applying a first uniform transformation to the state of the child-replica-ID creation mechanism of said parent replica;
   computing a new state for the child-replica-ID creation mechanism of said parent replica by applying a second uniform transformation to its current state; and
   replacing the state of the child-replica-ID creation mechanism with said new state.

2. The method, as claimed in claim 1, wherein each replica is viewed as having a generation number, the generation number of a replica with no parent replica being 0 and the generation number of a child replica being one more than the generation number of its parent replica, and
   said replica identifier includes a plurality of fields, each field corresponding to a different generation number greater than 0, in which the identifier for a child replica with a given generation number inherits from the identifier of its parent replica the contents of all fields corresponding to generation numbers less than the given generation number, and
   for a given parent replica, the contents of the field corresponding to the generation number of child replicas of said parent replica are distinct in the identifiers of the parent replica and each of the child replicas of said parent replica,
   the computation of an identifier for a replica with a given generation level as the child replica of a given parent replica failing if the fields in the identifier of said parent replica corresponding to generation levels less than the given generation number occupy the entire identifier of said parent replica,
   the computation of an identifier for a replica with a given generation level as the child replica of a given parent replica also failing if all possible contents for the field corresponding to the given generation number have been used in the identifiers of other child replicas of the given parent replica.

3. The method, as claimed in claim 2, wherein the field corresponding to a given generation number contains 0 in the identifier of a replica with the next-lower generation number, and contains a positive integer in the identifier of a given child replica with the given generation number, said positive integer being one more than the number of identifiers previously assigned to other child replicas of the parent replica of the said given child.

4. The method, as claimed in claim 2, wherein the maximum number of fields in a replica identifier is identical for all replica identifiers.

5. The method, as claimed in claim 4, wherein the length of the field corresponding to a given generation number is identical for all replica identifiers.

6. The method as in claim 1, wherein the replica identifier corresponds to an integer greater than or equal to 0 and less than or equal to some predetermined maximum value,
   with the integer 0 assigned to the original replica and the integer 1 assigned to the first replica created from the original replica,
   with the corresponding integer of the replica identifier of the first replica created from a parent other than the original replica having twice the corresponding integer of the parent's replica identifier, and
   with the corresponding integer of the replica identifier of a replica other than the first replica of its parent having one more than twice the corresponding integer of the identifier for the last replica previously created from the same parent replica,
   said replica creation failing if the corresponding integer exceeds the predetermined maximum value.

7. The method, as claimed in claim 1, wherein it can be determined from the identifier of a given replica whether the given replica is the child of some other replica.

8. The method, as claimed in claim 1, wherein the identifier of a child replica's parent can be obtained by applying a third uniform transformation to the identifier of said child replica.

9. The method, as claimed in claim 1, wherein it can be determined from the identifier of a given replica whether the given replica is the child of some other replica, and wherein the identifier of a child replica's parent can be obtained by applying a third uniform transformation to the identifier of said child replica.

10. A method for determining the history of replica creations by which a replica with a given identifier, generated by the method of claim 9, was derived directly or indirectly from an original replica, comprising:

setting a current identifier to the given identifier and repeatedly determining the identifier of the parent of the replica identified by the current identifier, then setting the current identifier to the identifier of said parent, said repetition terminating upon determining that the replica identified by the current identifier is not the child of any other replica.

11. A method for determining the history of replica creations by which a replica with a given identifier, generated by the method of claim 2, was derived directly or indirectly from an original replica, comprising:

setting a current identifier to the given identifier and repeatedly determining the identifier of the parent of the replica identified by the current identifier, then setting the current identifier to the identifier of said parent, said repetition terminating upon determining that the replica identified by the current identifier is not the child of any other replica, wherein a predetermined value is reserved for the field corresponding to generation 1 in the identifier of a replica with generation number 0, and a replica identifier is determined to identify the child of some other replica if and only if the field corresponding to generation number 1 does not contain said predetermined value, wherein a predetermined value is reserved for the field corresponding to a given generation number in the identifier of any replica with the next-lower generation number, and the replica identifier of a child replica's parent is determined from the identifier of said child replica by replacing, with said predetermined value, the contents of the field in the identifier of said child replica corresponding to the generation number of the child replica.

12. A method for determining the history of replica creations by which a replica with a given identifier, generated by the method of claim 6, was derived directly or indirectly from an original replica, comprising:

setting a current identifier to the given identifier and repeatedly determining the identifier of the parent of the replica identified by the current identifier, then setting the current identifier to the identifier of said parent, said repetition terminating upon determining that the replica identified by the current identifier is not the child of any other replica, in which a replica identifier is determined to identify the child of some other replica if and only if it is not equal to 0, in which the replica identifier of a child replica's parent is determined by:

setting a current value to the identifier of said child replica, repeatedly dividing the current value by two, obtaining an integer quotient and remainder, determining whether the remainder was zero, and setting the current value to the quotient, terminating the repetition if the remainder was determined to be zero, and using the current value as the replica identifier of said child replica's parent.

13. The method, as claimed in claim 1, in which the initial state of a replica's child-replica-ID creation mechanism is obtained by applying a third uniform transformation to the identifier of said replica.

14. The method, as claimed in claim 1, in which the identifier of a replica can be obtained by applying a third uniform transformation to the state of the child-replica-ID creation mechanism of said replica.

15. A system for uniquely identifying, with replica identifiers of bounded length, each replica in a plurality of replicas of data, each replica having an associated child-replica-ID creation mechanism, said system comprising:

a replicator for creating a child replica from a parent replica;

a computation device for computing a replica identifier for said child replica by applying a first uniform transformation to the state of the child-replica-ID creation mechanism of said parent replica, computing a new state for the child-replica-ID creation mechanism of said parent replica by applying a second uniform transformation to its current state, and replacing the state of the child-replica-ID creation mechanism with said new state.

16. The system, as claimed in claim 15, wherein each replica is viewed as having a generation number, the generation number of a replica with no parent replica being 0 and the generation number of a child replica being one more than the generation number of its parent replica, and said replica identifier includes of a plurality of fields, each field corresponding to a different generation number greater than 0, in which the identifier for a child replica with a given generation number inherits from the identifier of its parent replica the contents of all fields corresponding to generation numbers less than the given generation number, and for a given parent replica, the contents of the field corresponding to the generation number of child replicas of said parent replica are distinct in the identifiers of the parent replica and each of the child replicas of said parent replica, the computation by said computation device of an identifier for a replica with a given generation level as the child replica of a given parent replica failing if the fields in the identifier of said parent replica corresponding to generation levels less than the given generation number occupy the entire identifier of said parent replica, the computation by said computation device of an identifier for a replica with a given generation level as the child replica of a given parent replica also failing if all possible contents for the field corresponding to the given generation number have been used in the identifiers of other child replicas of the given parent replica.

17. The system, as claimed in claim 16, wherein the field corresponding to a given generation number contains 0 in the identifier of a replica with the next-lower generation number, and contains a positive integer in the identifier of a given child replica with the given generation number, said positive integer being one more than the number of identifiers previously assigned to other child replicas of the parent replica of the said given child.

18. The system, as claimed in claim 16, wherein the maximum number of fields in a replica identifier is identical for all replica identifiers.

19. The system, as claimed in claim 18, wherein the length of the field corresponding to a given generation number is identical for all replica identifiers.

20. The system as in claim 15, wherein the replica identifier corresponds to an integer greater than or equal to 0 and less than or equal to some predetermined maximum value, with the integer 0 assigned to the original replica and the integer 1 assigned to the first replica created from the original replica, with the corresponding integer of the replica identifier of the first replica created from a parent other than the original replica having twice the corresponding integer of the parent's replica identifier, and with the corresponding integer of the replica identifier of a replica other than the first replica of its parent having one more than twice the corresponding integer of the identifier for the last replica previously created from the same parent replica, said replica creation failing if the corresponding integer exceeds the predetermined maximum value.

21. The system, as claimed in claim 15, wherein it can be determined from the identifier of a given replica whether the given replica is the child of some other replica, and wherein the identifier of a child replica's parent can be obtained by applying a third uniform transformation to the identifier of said child replica.

22. The system, as claimed in claim 15, wherein the identifier of a child replica's parent can be obtained by applying a third uniform transformation to the identifier of said child replica.

23. The system, as claimed in claim 15, in which the initial state of a replica's child-replica-ID creation mechanism is obtained by applying a third uniform transformation to the identifier of said replica.

24. The system, as claimed in claim 15, in which the identifier of a replica can be obtained by applying a third uniform transformation to the state of the child-replica-ID creation mechanism of said replica.

25. A probable storage medium tangibly embodying a program of machine-readable instructions executable by a digital processing apparatus to perform a computer-implemented method for uniquely identifying, with replica identifiers of bounded length, each replica in a plurality of replicas of data, each replica having an associated child-replica-ID creation mechanism said method comprising;

creating a child replica from a parent replica;

computing a replica identifier for said child replica by applying a first uniform transformation to the state of the child-replica-ID creation mechanism of said parent replica;

computing a new state for the child-replica-ID creation mechanism of said parent replica by applying a second uniform transformation to its current state; and replacing the state of the child-replica-ID creation mechanism with said new state.

26. The method, as claimed in claim 25, in which the initial state of a replica's child-replica-ID creation mechanism is obtained by applying a third uniform transformation to the identifier of said replica.

27. The method, as claimed in claim 25, which the identifier of a replica can be obtained by applying a third uniform transformation to the state of the child-replica-ID creation mechanism of said replica.

* * * * *